LUIS DRESCHER M.D.
Galvano-Faradic Machine.
No. 116695 — Patented Jul. 4 1871
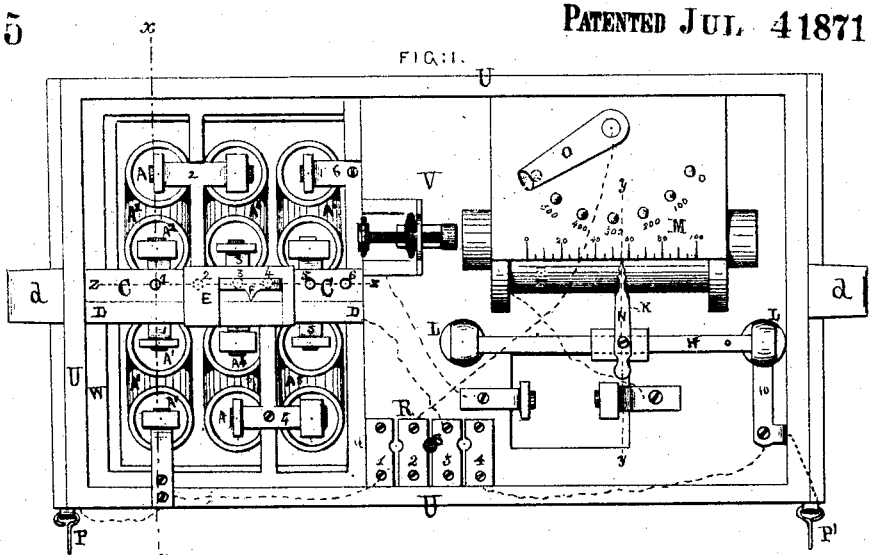
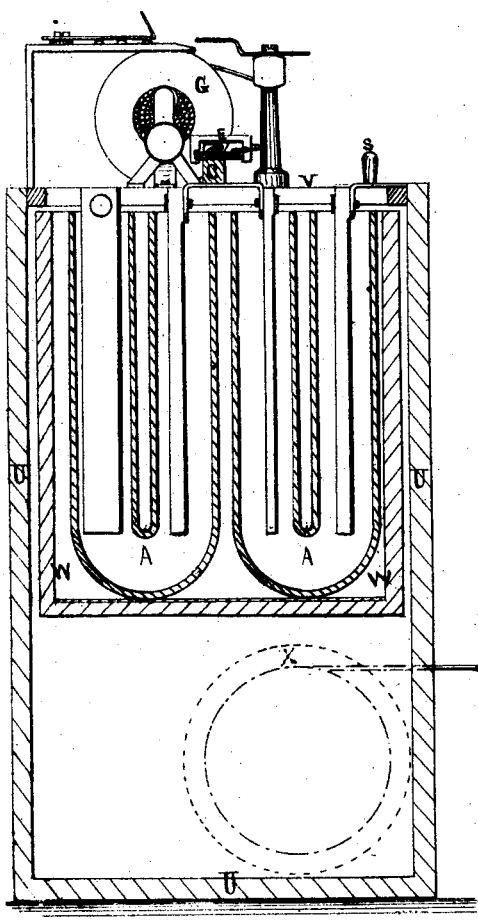
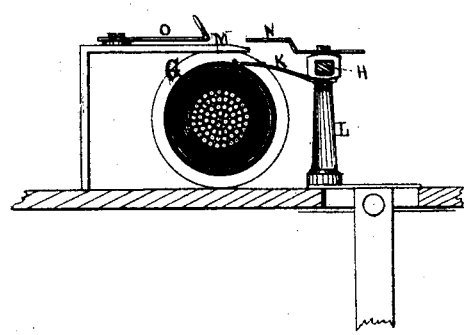
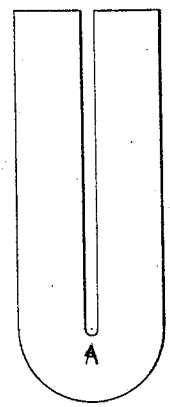
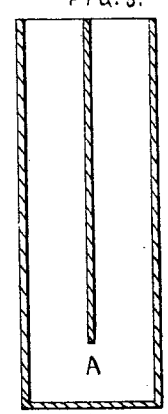
WITNESSES
H. H. Young
Ewell A. Dick
Luis Drescher M.D.
Inventor
By David A. Burr Atty.

LUIS DRESCHER M.D.
*Galvano-Faradic Machine.*
FIG: 7.
FIG: 8.
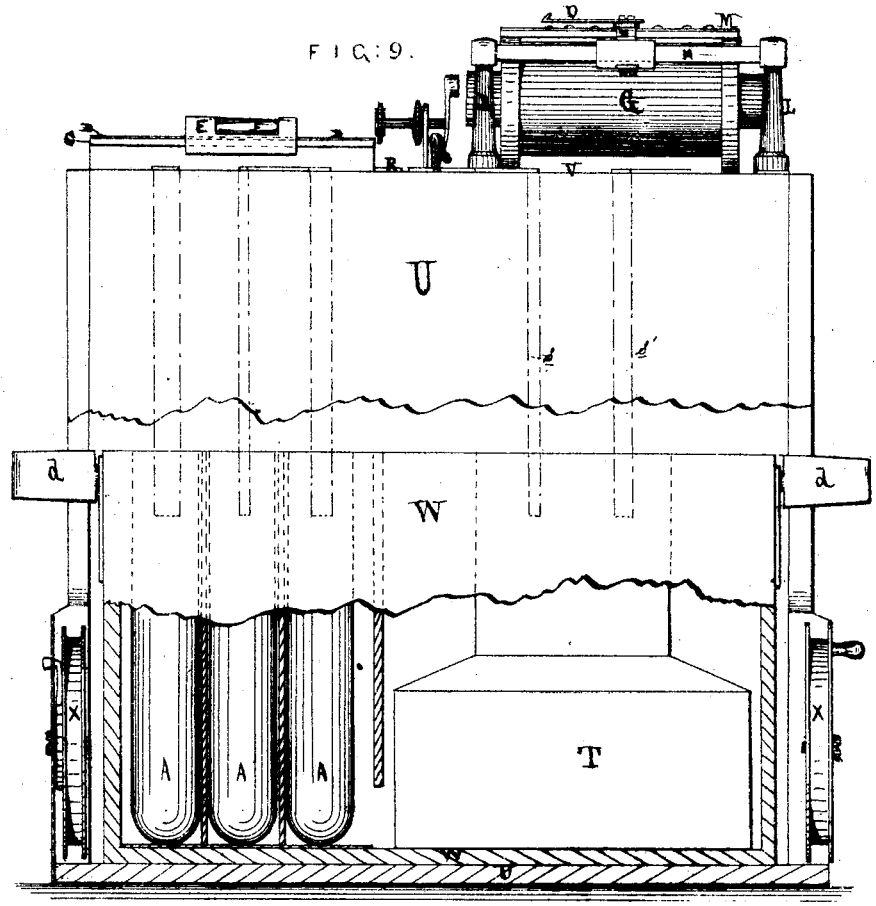
FIG: 9.
WITNESSES
H. H. Young
Ewell A. Dick
Luis Drescher M.D.
Inventor
By David A. Burr Atty.

LUIS DRESCHER M.D.
Galvano-Faradic Machine.
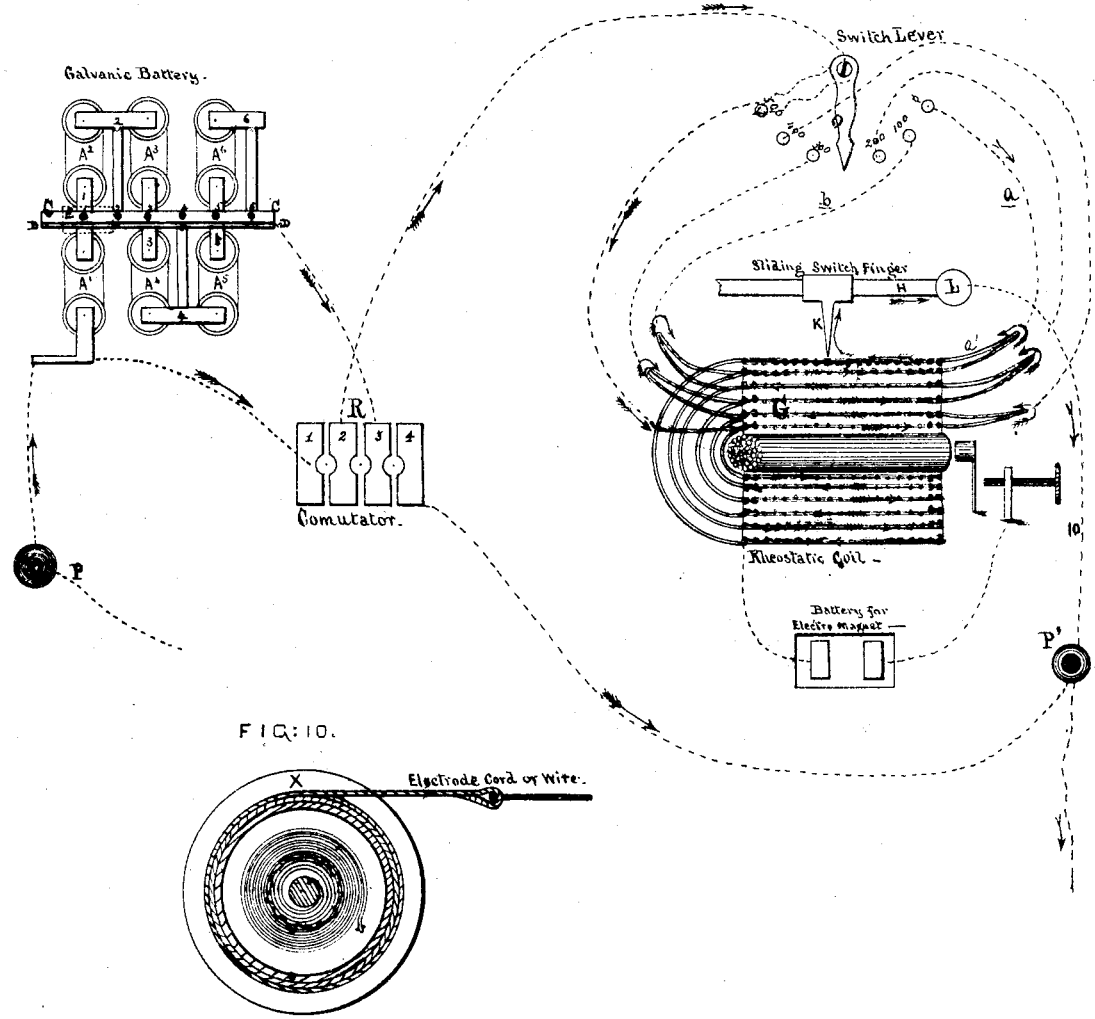
Diagram — FIG: 11.
FIG: 10.
Witnesses:
H. H. Young
Ewell A. Dick
Luis Drescher M.D.
Inventor
By David A. Burr
Atty.

UNITED STATES PATENT OFFICE.

LUIS DRESCHER, OF NEW YORK, N. Y.

IMPROVEMENT IN ELECTRO-MEDICAL APPARATUS.

Specification forming part of Letters Patent No. 116,695, dated July 4, 1871.

*To all whom it may concern:*

Be it known that I, LUIS DRESCHER, M. D., of the city, county, and State of New York, have invented an Improved Galvano-Faradic Instrument, of which the following is a specification:

The first part of my invention relates to the use of a U-shaped cup or of a vessel divided by a vertical partition into two compartments communicating freely at the bottom for the cells of a galvanic battery; the object thereof being: 1st, to prevent all possible contact of the two battery-plates in the cell even when the cell is reduced to a very small compass. 2d, to avoid all danger of spilling the fluids of the battery in the transportation thereof; and 3d, to obtain readily a constant battery of a greater or lesser resistance, as required, without the use of porous cups. I contemplate the combination of sand, pulverized calcined clay, papier-maché, or other equivalent porous material, with my improved U-shaped or partitioned cells, the porous material being placed in the bend or bottom of the cell so as to be interposed between the two branches, compartments, or divisions thereof, and form a separating medium, through which alone the fluids in the one compartment and the other can communicate, the object thereof being to obtain thereby a highly constant galvanic battery whose intensity may be easily adjusted. The second part of my invention relates to the interception of the current, either induced or direct, passing through the coil or helix of an electro-magnet, by means of a switch-finger arranged to slide from end to end of the helix in contact with its outer coil, so that the current passing through the same may be diverted therefrom through this finger at any one convolution of the coil; the object of this part of my invention being to control and regulate to the most minute degree the intensity of the galvanic or direct current where the helix is connected with a battery, or the intensity of the shocks of the Faradic or induced current, where the instrument is used solely as an electro-magnetic machine, by including or excluding from the current the convolutions of the outer coil of wire in the helix, one at a time, if desired, up to the full number embraced therein from end to end, thus increasing or diminishing the resistance by determinate units, each consisting of a single convolution, as aforesaid. The third feature of my invention relates to a peculiar construction of the helix of an electro-magnetic or galvano-Faradic machine, wherein the ends of each of the successive concentric coils or layers of wire in the helix are extended and connected to pins or points within reach of a switch-lever, so that by the movement of the lever one or more entire coils or layers of the wire may be at pleasure included in or excluded from the current passing through the outermost layer, and the resistance to the current be thus increased or diminished by determinate degrees or divisions on a scale, each division of which embraces a number of units equal to the number of convolutions in a single layer of the helix; the object of this part of my invention being to provide for an increase or diminution of the intensity of the electric or galvanic current passing through the helix by increasing or diminishing the amount of resistance offered thereto in determinate proportions or degrees, each measured by the resistance of an entire layer or coil of said helix. The fourth feature of my invention relates to the combination of reels with the electrode wires or cords of an electric or galvanic instrument, and with suitable metallic strips or wires connecting the same with the proper poles of the instrument or battery, whereby the electrode wires or cords may be wound up within the instrument, when not in use, without disconnection. The fifth feature of my invention relates to the combination of a switch-stopper with metallic plates, so arranged and connected with the electrode wires and with the poles of my improved galvano-Faradic instrument as that it will, by its position, serve to connect the electrodes either with the electro-magnetic or Faradic instrument alone, or with the galvanic-battery and Faradic instrument connected to act conjointly, forming my improved galvano-Faradic machine, or with the galvanic-battery only.

Figure 1 is a top or plan view of my improved galvano-Faradic instrument complete; Fig. 2, a transverse section in line *x x* of Fig. 1; Fig. 3, a transverse section of the rheostatic coil or helix of the electro-magnet in line *y y* of Fig. 1, illustrating the application of the switch-finger thereto; Fig. 4, a detached elevation of the improved battery-cup or cell, Fig. 5 being a vertical section illustrating a modification thereof; Fig. 6, a vertical section illustrating the combination of a porous resisting medium with the U-shaped cup;

Fig. 7, a detached sectional view of the slide for coupling the galvanic-battery cells, in line z z of Fig. 1; Fig. 8, a similar view of the same device in a second position; Fig. 9, a side elevation, partly broken away and in vertical section, of my improved galvano-Faradic instrument. Fig. 10 is an elevation of the electrode reel with its front plate removed; and Fig. 11 is a diagram illustrating the construction of my improved rheostatic coil, and the connection of each coil or layer thereof with a separate switch-point; also the connection and operation of the several parts of my improved galvano-Faradic machine.

The improved battery of my galvano-Faradic instrument consists of a series of galvanic cells so arranged as that the number united or combined to form the battery may be increased or diminished one cell at a time, if desired.

A, Figs. 4, 5, and 6, is my improved cell for a galvanic battery. It consists of a tube of glass or other suitable material, bent upon itself so as to be U-shaped, as illustrated in the drawing, Fig. 4, or as an equivalent for the bent tube of a cup or vessel provided with a central partition which does not extend to the bottom thereof, but divides the vessel into two compartments having free intercommunication at the bottom of the cup, as illustrated in Fig. 5 of the drawing. These bent tubes or cups A A are filled with the usual acid solution, and plates of zinc or carbon, or any other of the reophors which may be used for galvanic batteries, united in pairs by a metallic strip in the usual manner, are inserted therein, so that each tube or cup shall contain a plate of zinc in one of its branches or compartments and a plate of carbon in the other. By thus forming separate yet communicating compartments in each cell all possible contact of the two plates is surely avoided, and the liability of wasting the fluid in the cells by spilling over during transportation is almost entirely obviated. In order to convert a galvanic battery constructed of my improved U-shaped or divided cells into a constant battery of more or less resistance, I fill the U-shaped cell to a greater or lesser distance above its bend, or the divided cell to a greater of lesser extent above its partition, with a suitable porous material, such as powdered calcined clay, sand, papier-maché, &c., B, Fig. 6, and then fill the one compartment or branch of the cell with the usual chromic-acid or nitric-acid solution, and the other with the usual sulphuric-acid solution, as in case of the porous-cup cells of the ordinary batteries. The amount of resistance in the battery may evidently be regulated at pleasure by the quantity of porous material interposed between the two compartments of each cell. In forming my improved battery I so combine the cells thereof as that they may be included or excluded from the battery one at a time, and the power of the battery be thus increased or reduced at pleasure by the smallest possible division thereof. My novel arrangement consists, first, in so placing the cells as that the positive metal or substance in the division of one cell shall be connected with the negative metal or substance in a division of the next adjoining cell—for example, in a battery of six cells, as illustrated in Figs. 1 and 11. The second branch of the bent tube or U-shaped cell $A^1$, in the first left-hand corner of the case, contains a carbon plate connected by a metallic strip with a carbon plate in the first branch of the next cell $A^2$, the zinc in the second branch of said cell being connected with the carbon in the next, and so on through the entire series. In order to include or to exclude one or more cells from the battery a bar or plate of hard rubber or other suitable insulating material, C, is placed at any convenient point, by preference centrally, between the cells and above them, as illustrated in Figs. 1, 7, 8, and 11. This plate C is provided with a number of insulated metallic pins or points 1, 2, 3, &c., corresponding to the number of cells in the battery, and which are arranged along the plate at equal distances apart to project slightly therefrom. Each point is connected in regular order, by a wire or other metallic strip, with the strip connecting the positive and negative plates placed between some one designated pair of cells, the point No. 1, for instance, being connected with the strip connecting the zinc plate of cell 1, and the carbon plate of cell 2, the point No. 2 being connected with the strip uniting the zinc plate of cell 2 with the carbon of cell 3, and so on, as illustrated in the drawing. (See Fig. 11.) A narrow metallic strip, D, connected with one of the electrodes of the battery, or with a suitable commutator or switch, is secured upon the plate or bar C to extend its entire length, but is kept properly separated and insulated from the metallic points 1, 2, 3, 4, &c. Although the single plate of the first cell in the battery is connected directly with one electrode thereof, the single plate in the last cup in the battery is connected, by a metallic strip or wire, with a point on the insulated plate C, and the metallic strip D of said plate is alone connected, as described, with the opposite electrode. Hence, to complete the circuit of the current through the entire battery a connection must be formed between said last point 6 of the plate C and its metallic strip D. This is effected by means of a metallic slide, E, which is made to move easily along the plate C from end to end thereof, in contact with the strip D, but above and removed from the points 1 2 3. This slide E is provided with a metallic spring, F, so formed and placed as that it will glide over the points 1, 2, 3, &c., in constant contact therewith, and of such length with reference thereto that although it will just span the interval between any two of them so as to bear upon both, (see Fig. 7,) yet a movement either way will leave it in connection with one only, as illustrated in Fig. 8. Hence, if the slide be moved so as to bear upon the point 1 only (see dotted lines, Fig. 11) the galvanic current induced by the two plates in the cell No. 1 will alone be brought into use, for the only course left open for it to follow is by way of the point 1, connected with the strip between the first and second cells through the slide E to the metallic strip D, and thence to the second electrode. If, however, the slide be moved to contact with the point 2, then the current, no longer intercepted at the strip 1, will pass through the second cell;

but, being then intercepted, will pass to the electrode through the point 2. In moving the slide the contact and connection are established through the point 2 before they are broken at the point 1, (see Figs. 1 and 8,) so that there is no interruption whatever of the current in increasing its intensity by including the second cell in the circuit. In this manner the cells may all be included or excluded singly from the circuit without interrupting the constant flow of the current. G is the helix of an electro-magnetic machine of ordinary principle and construction in its general features, and which is combined with my improved galvanic battery to constitute my improved galvano-Faradic machine, as hereinafter set forth. Instead of connecting the outer coil of the helix directly with one electrode, $P^1$, of the instrument, I connect the wire 10 extending to said electrode (see Fig. 11) with a metallic bar, H, traversed by a metallic slide carrying a finger, K. (See Figs. 2 and 3.) The bar H is supported alongside of the helix G, parallel thereto, upon suitable standards L L, at such a height as that the finger K will in its movement bear upon the periphery of the helix from end to end thereof. The insulating covering of the helix is removed along the path traversed by the end of the finger K, so that its point may come into direct contact with each convolution of its outer coil. (See diagram, Fig. 11.) Hence, by means of this finger the current passing through this coil may be diverted therefrom and transmitted to the electrode $P^1$ at any desired point in its length. M, Figs. 1 and 3, is a table or shelf, arranged above and over the helix G, parallel thereto, and extending back on the opposite side thereof from the bar H; and N is an index-pointer, affixed to the slide carrying the finger K so as to project over the edge of the table M, as illustrated in Fig. 3. A scale of units corresponding to the number of convolutions in the outer coil of the helix, or of any other desired units, is marked upon the upper edge of the table M, (see Fig. 1,) so that the exact number of convolutions intercepted by the finger K beneath may be seen by the operator at a glance. The helix G is formed in the usual manner by winding a number of coils of wire spirally, in successive layers, one upon the other about a central core; but in my improved rheostatic helix G I draw out the ends of each finished spiral coil, so that I am enabled thereby to separate said coils and keep them distinct the one from the other, and afterward connect them outside of the helix, so as to form the one continuous and unbroken wire from the exterior to the interior of the helix, or vice versa, found in the ordinary helices of electro-magnets. The loops formed by the connections of the several coils or layers of the helix are each connected, respectively, by a wire extending therefrom, to an insulated point upon the table M, Fig. 1. (See, for illustration, diagram, Fig. 11.) These points are arranged at equal distance apart, in an arc, having the axis of a metallic pointer or switch-lever, O, as its center, and this lever is of such length as that it may reach and touch any one of them. They are numbered with figures increasing successively in ratio corresponding to the number of convolutions in each coil of the helix—if, for instance, there are one hundred convolutions in each coil the first point connected with the first loop uniting the outer and next inner coil will be number 0, the second point connected with the loop uniting the second coil, and that next beneath it, will be numbered 100, the third points connected with the third loop 200, and so on. (See Fig. 1 and see diagram, Fig. 11, for illustration thereof.) In my improved galvano-Faradic instrument the pointer or switch-lever O is connected, by a wire, either directly or mediately, by means of a commutator, with one pole of the galvanic battery A A A; and the operation of my instrument thus constructed and arranged is as follows: By turning the pointer O into contact with the point numbered zero, and sliding the switch-finger K into contact with the first convolution of the outer coil of the helix G, it is evident that the galvanic current from the battery passing through the pointer O, the zero-pin, and its connecting-wire $a$ to the helix, will, immediately upon reaching the first convolution of the helix, be at once diverted therefrom through the switch-finger K, and will complete its circuit without passing through the helix; consequently the resistance of the helix will, as indicated by the number of said first point, be naught. If, however, the switch-finger be moved along so as to be in contact with the fiftieth convolution of the coil, as indicated by the number 50 on the scale above, (see Fig. 1,) then the galvanic current will pass through fifty convolutions of the coil before it is diverted, and the degree of resistance which it has met with is measured by the number 50. Thus, by sliding along the switch-finger any number of convolutions may be included in the circuit through which the current passes, up to the entire number found in the coil, and the resistance be thereby consequently increased by very small proportions up to the resistance of the whole length of that coil, if desired, and by a reverse movement the resistance may be likewise diminished. By a movement of the sliding switch-finger, as described, convolution by convolution of the outer coil, one at a time, may be included or excluded from the circuit of the galvanic current. As, however, the constant contact of said finger must always divert the current from the helix at one point or another of its outer coil, it is evident that, so long as the circuit passes through the wire $a$, connected directly with the outer coil, the resistance cannot be increased at the utmost beyond the length of said coil. If, however, the switch-lever or pointer O be placed in contact with the point 100, which is connected by the wire $b$ with the second coil of the helix, (see Fig. 11,) the current will pass to this second coil, viz., that next beneath the outer coil, and, passing along its one hundred convolutions, will, by means of the loop $a'$, pass into the outer coil and along the same until diverted by the switch-finger K, as above described. Now, by a movement of said finger K, convolution by convolution of the outer coil can be added, one at a time, to the convolutions of the next inner coil, and the resistance proportionately increased by determinate units up to two hundred convolutions, or the entire length of the two coils united. So, by turning the switch-lever O to the point numbered 500 the current is made to enter the helix in its innermost coil, and to pass, as indicated by the arrows, through all the coils to the outermost, and then the convolutions of the outermost may be added, one at a time, if required, until its length also has been added to the others. Thus, by my invention, I may increase or decrease the intensity of the galvanic current by including or excluding one cell at a time from the battery, and then measure and control its intensity between each cell—that is to say, after adding a cell to or subtracting a cell from the battery, by increasing or decreasing a resistance to the current determined by including in or excluding from its circuit the convolutions of all the coils of the helix of an electro-magnet, one by one, if desired, or in proportions or degrees so small as to be measured by one of the entire number of convolutions of wire in said helix. By connecting the pointer O with one pole of the cell of the electro-magnetic battery instead of with the galvanic battery, as described, the intensity of the shocks of the electro-magnetic current may be in like manner graduated and measured with the most minute precision, by adding or subtracting one convolution of a coil at a time from the circuit in the helix about the magnet. In order to connect at pleasure one or more of the several parts of the instrument with its electrodes, either singly or conjointly, I employ a simple stopper-commutator, R, Figs. 1 and 11. This commutator consists of four narrow metallic plates secured upon the top plate of the instrument at any convenient point, each separated by a narrow open interval so as to be wholly insulated the one from the other. Recesses are so formed in the opposite adjacent edges of the plates, as to form each arcs of a circle having its center in the open interval between the plates, so that they will receive and embrace a round and tapering pin or stopper, S, when inserted therein. By the insertion of the metallic stopper S between any two of the plates these plates become connected, so that the galvanic or electric current will readily pass from the one to the other. I connect the first plate, 1, by a suitable wire with the pole P and electrode of the instrument next the galvanic battery; the second plate, 2, with the switch-lever O, by which connection is made with the helix G; the third plate, 3, with the metallic strips upon the adjusting-plate E of the galvanic battery; and the fourth plate, 4, with the second pole P' and electrode of the instrument. Hence, by inserting the stopper S between the first and second plates of the commutator the electrodes are connected with the electro-magnet alone and the galvanic battery is entirely cut off. If the stopper be placed between the second and third plates the electrodes are placed in connection with both the galvanic battery and electro-magnet, so that the galvanic current will pass through the helix of the magnet. In this last case, by simply unscrewing the set-screw of the spring-armature or hammer of the magnet it is left passive, and the coils of its helix may be used simply to regulate the intensity of the galvanic current; otherwise the action of the electro-magnet is combined with that of the galvanic battery. If the stopper S be placed between the third and fourth plates the galvanic battery alone is connected with the electrodes independently of the Faradic instrument. T is the cell of the Faradic instrument, and $s\ s'$ its zinc and carbon plates. The jar or vessel constituting the cell T is enlarged at the bottom to contain a large charge of fluid, but is contracted into a narrow neck at its mouth, barely large enough to receive the two plates. This form of the vessel serves to overcome the tendency of the fluid to splash or spill out in transportation. U is the outer case or box containing my improved instrument; V, the top plate of the box. From this plate are suspended the battery-plates, and on it are secured the rheostatic coil, and the commutator and switch devices, as has been described. W is an inner box or case, fitting closely within the outer case U, but made so much less in height as that the battery-cells fitted and secured therein may be lowered entirely clear of the battery-plates suspended over them. (See Fig. 9.) Hence, when the instrument is not in use the inner case W, with the battery-cells, rests upon the bottom of the outer case U; but when it is required for use this inner case is elevated by means of handles or buttons $d\ d$ at its ends, which project through slots in the outer case U until the battery-plates are fully immersed in the fluid of the cells, and is then secured by simply turning the handles $d\ d$ in an enlarged portion of the slots through which they project. X X, Figs. 9 and 10, are ordinary reels, either operated by a self-contained spring, so as to be self-winding, or made with a simple crank to be wound by hand. These reels are secured in the front corners of the case of the instrument, near the bottom thereof, and are properly connected by metallic strips or wires, each with one of the poles of the instrument. Upon these reels are wound metallic cords or tapes to constitute electrodes of the instrument. Instead of placing the reels within the case of the instrument I contemplate placing them in the handles of the electrodes used therewith, so that the electrode cords or wires may be wound up each within its proper handle. By thus winding up the electrode cords or wires within the case of the instrument, or within the handles of the electrodes thereof, the inconvenience of carrying them separately and loosely, and of attaching and detaching them from the one and the other, is obviated, and this portion of the instrument is reduced to a neat compact form.

I claim as my invention—

1. Double or U-shaped cells for a galvanic battery, each cell being formed with distinct yet communicating compartments to receive its positive and negative plates, substantially as and for the purpose herein set forth.

2. A metallic needle or finger, traversing upon a metallic bar or plate parallel to the electro-magnet of a Faradic instrument, and connected with one of its electrodes so as to bear with its point upon the outer spiral layer of the induction-coil of the magnet, said layer being so exposed as to permit a direct contact of the finger with each convolution of its coil, substantially as and for the purpose herein set forth.

3. The combination of each of the loops by which the several layers in the helix or induction-coil of an electro-magnet are united to form one continuous length of wire, with one of a series of insulated points arranged in order upon a suitable plate or table within reach of a metallic pivoted switch-lever connected with one of the electrodes of the instrument or with a separate galvanic battery, so that a current passing through said switch-lever may be directed to either of the layers or coils of the helix at pleasure, substantially as and for the purpose herein set forth.

4. The combination of one or more suitable reels with the case of a galvanic or electro-magnetic instrument or the handles of its electrodes, and with the electrode cords or wires of the instrument to wind or coil them up neatly and compactly, substantially as and for the purpose herein set forth.

LUIS DRESCHER, M. D.

Witnesses:
   WILLIAM ENGELHARDT,
   LOUIS BEEKMANN.